US012322229B2

(12) United States Patent
Vemuri et al.

(10) Patent No.: US 12,322,229 B2
(45) Date of Patent: Jun. 3, 2025

(54) DETERMINING A LOCATION OF A VEHICLE DIGITAL KEY WALLET

(71) Applicant: GM GLOBAL TECHNOLOGY OPERATIONS LLC, Detroit, MI (US)

(72) Inventors: Venkata Naga Siva Vikas Vemuri, Farmington Hills, MI (US); John Sergakis, Bloomfield Hills, MI (US); Daniel E. Nicholson, Oberursel (DE)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 18/333,918

(22) Filed: Jun. 13, 2023

(65) Prior Publication Data

US 2024/0420530 A1 Dec. 19, 2024

(51) Int. Cl.
*G08B 21/00* (2006.01)
*G07C 9/00* (2020.01)

(52) U.S. Cl.
CPC ................................ *G07C 9/00896* (2013.01)

(58) Field of Classification Search
CPC .................................................. G07C 9/00896
USPC .......................................................... 340/5.72
See application file for complete search history.

(56) References Cited

U.S. PATENT DOCUMENTS

| | | | | |
|---|---|---|---|---|
| 10,266,149 | B1 * | 4/2019 | DeCia | G08G 1/127 |
| 11,367,356 | B1 * | 6/2022 | Ketharaju | B60W 60/0025 |
| 2018/0357846 | A1 * | 12/2018 | Chen | B60R 25/241 |
| 2021/0168602 | A1 * | 6/2021 | Kim | H04W 12/041 |
| 2021/0350641 | A1 * | 11/2021 | Otican | B60R 25/24 |
| 2023/0216947 | A1 * | 7/2023 | Bernardi | H04L 67/10<br>713/150 |
| 2023/0229994 | A1 * | 7/2023 | Peres | H04W 12/06<br>705/7.17 |
| 2023/0322185 | A1 * | 10/2023 | Lerch | H04W 4/40<br>340/10.5 |

* cited by examiner

*Primary Examiner* — Mark S Rushing
(74) *Attorney, Agent, or Firm* — Quinn IP Law

(57) ABSTRACT

A system and method for estimation method for determining a location of a vehicle digital key wallet includes selecting, by a user, whether to store a digital key wallet in a cloud storage or within a secure telematics unit contained within a vehicle. The digital key wallet is used to initiate an event within the vehicle. A backoffice server stores data including a radio intelligence database and a rule-based vehicle pattern matrix. The digital key wallet is switched to a fallback device based on the status of a communication link with the secure telematics unit, the radio intelligence database, and the rule-based vehicle pattern matrix.

20 Claims, 5 Drawing Sheets

100

200

DETERMINING A LOCATION OF A VEHICLE DIGITAL KEY WALLET

INTRODUCTION

Vehicles are a staple of everyday life. Special use microcontrollers, telematic communication systems, laser technologies, and sensors may be used in many different applications in a vehicle. Microcontrollers, telematics, and sensors may be utilized in enhancing automated structures that offer state-of-the-art experience and services to the customers, for example in tasks such as body control, camera vision, information display, security, autonomous controls, etc. Access to a vehicle used to require a physical key that had to be inserted into a door and turned to unlock the vehicle. Push-button access also became an option to access a vehicle. And wireless key fobs also became available such that a person, with the key fob in their pocket, may unlock a vehicle and start the engine with a simple touching the door and the push of a button.

Further, the advent of digital keys has allowed the use of a smartphone to perform the same functions as that of a car key. Unlock, lock, start the vehicle and multiple other functions may be accessed through a smartphone using communication protocols such as near field communications and ultra-wideband. The digital key information may be securely stored in a smartphone integrated secure element. However, while a digital key in a digital key wallet that is stored in a smartphone may offer flexibility and convenience, it also includes some risks. For example, if the phone becomes inoperable because it was dropped or has no battery life left, then the digital key wallet may not be accessed. If the digital key wallet may not be accessed, then access to the vehicle is also prohibited. Accordingly, it is desirable to provide the ability to automatically switch the storage location of a digital key wallet based on applications and situational awareness.

SUMMARY

Disclosed herein are a system and methods for determining a location of a vehicle digital key wallet, which may also be referred to as a digital key wallet. As disclosed herein, a method for determining a location of a vehicle digital key wallet may include selecting, by a user, whether to store a digital key wallet in a cloud storage or within a secure telematics unit contained within a vehicle. The digital key wallet may be used to initiate an event within the vehicle. The method may also include storing, in a backoffice server, a radio intelligence database and a rule-based vehicle pattern matrix. The method may include switching the digital key wallet to a fallback device based on the status of a communication link with the secure telematics unit, the radio intelligence database, and the rule-based vehicle pattern matrix.

Another aspect of the method may include that the cloud storage includes an internet-of-things broker based on a publish and subscribe messaging protocol including a message queuing telemetry transport (MQTT).

Another aspect of the method may include messaging one or more fallback devices using an internet-of-things broker.

Another aspect of the method may include where the fallback device is in a mobile communication device.

Another aspect of the method may include where the fallback device is a fleet management server.

Another aspect of the method may include where the fallback device is the secure telematics unit contained within the vehicle.

Another aspect of the method may include determining if the connectivity of the secure telematics unit is below a predefined threshold.

Another aspect of the method may include where the radio intelligence database may be used to predict a probability of the status of the communication link at a given instance at a location of the vehicle.

Another aspect of the method may include switching the digital key wallet to a second fallback device based on the status of the communication link with the secure telematics unit, the radio intelligence database, and the rule-based vehicle pattern matrix.

Another aspect of the disclosure may include a system for determining a location of a vehicle digital key wallet. The system may include a cloud storage to store a digital key wallet associated with a vehicle, where the digital key wallet may be used to initiate an event within the vehicle. The system may also include a secure telematics unit, within the vehicle, to store the digital key wallet. The system may also include a fallback device, to store the digital key wallet; and also, a backoffice server that may be used to store a radio intelligence database and a rule-based vehicle pattern matrix. The system may include where a user selects whether an initial location of the digital key wallet is stored in either the cloud storage or the secure telematics unit; and then based on a status of a communication link with the secure telematics unit, the radio intelligence database, and the rule-based vehicle pattern matrix, the digital key wallet may be switched to the fallback device.

Another aspect of the system is where the cloud storage may include an internet-of-things broker based on a publish and subscribe messaging protocol including a message queuing telemetry transport (MQTT).

Another aspect of the system is where the internet-of-things broker may control one or more fallback devices.

Another aspect of the system may include where the fallback device is a mobile communication device.

Another aspect of the system may include where the fallback device is a fleet management server.

Another aspect of the system may include where the fallback device is the secure telematics unit contained within the vehicle.

Another aspect of the system may include where the status of the communication link may include determining if a connectivity of the secure telematics unit is below a predefined threshold.

Another aspect of the system may include where the radio intelligence database is used to predict a probability of the status of the communication link at a given instance at a location of the vehicle.

Another aspect of the system may include where the rule-based vehicle pattern matrix includes a user behavior ruleset based on vehicle patterns including a time of day, a route, a trajectory, and one or more stops.

Another aspect of the system may include where, based on the status of the communication link with the secure telematics unit, the radio intelligence database, and the rule-based vehicle pattern matrix, the digital key wallet is switched to a second fallback device.

Another aspect of the disclosure may include a method for determining a location of a vehicle digital key wallet that may include determining a user behavior rule set based on a set of vehicle travel patterns of a vehicle in addition to determining if the vehicle is not in a first area. The method may continue by determining if the vehicle is traveling in a known roaming area, where if the vehicle is traveling in the known roaming area then the method may calculate a set of radio conditions and roaming area map, and based on the calculations, switch a digital key wallet to a next fallback location. Further, if the vehicle is not traveling in the known roaming area, then the method may include keeping the digital key wallet in its current location. However, if the method determines that if the vehicle is located in the first area then further includes locating the digital key wallet to a user preferred home location, recognizing and tracking when the vehicle moves from the first area, where if the vehicle stops in a known location area, the method may include performing a switching to a next best digital key wallet location, but if the vehicle stops in an unknown location area, the method may include keeping the digital key wallet in the current location.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
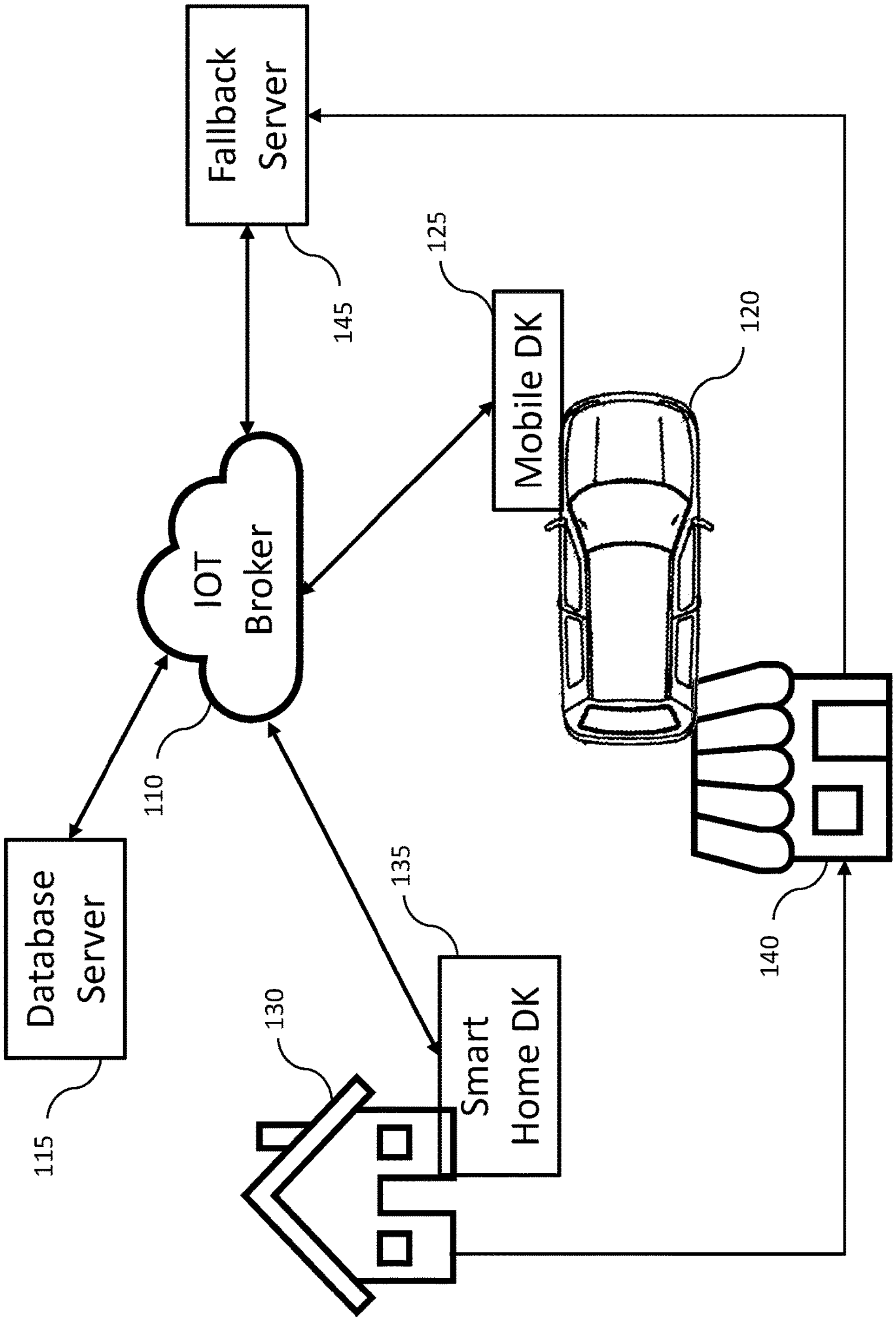
FIG. 1 is an illustration of an architecture to automatically switch digital key wallet based on pattern and radio intelligence, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
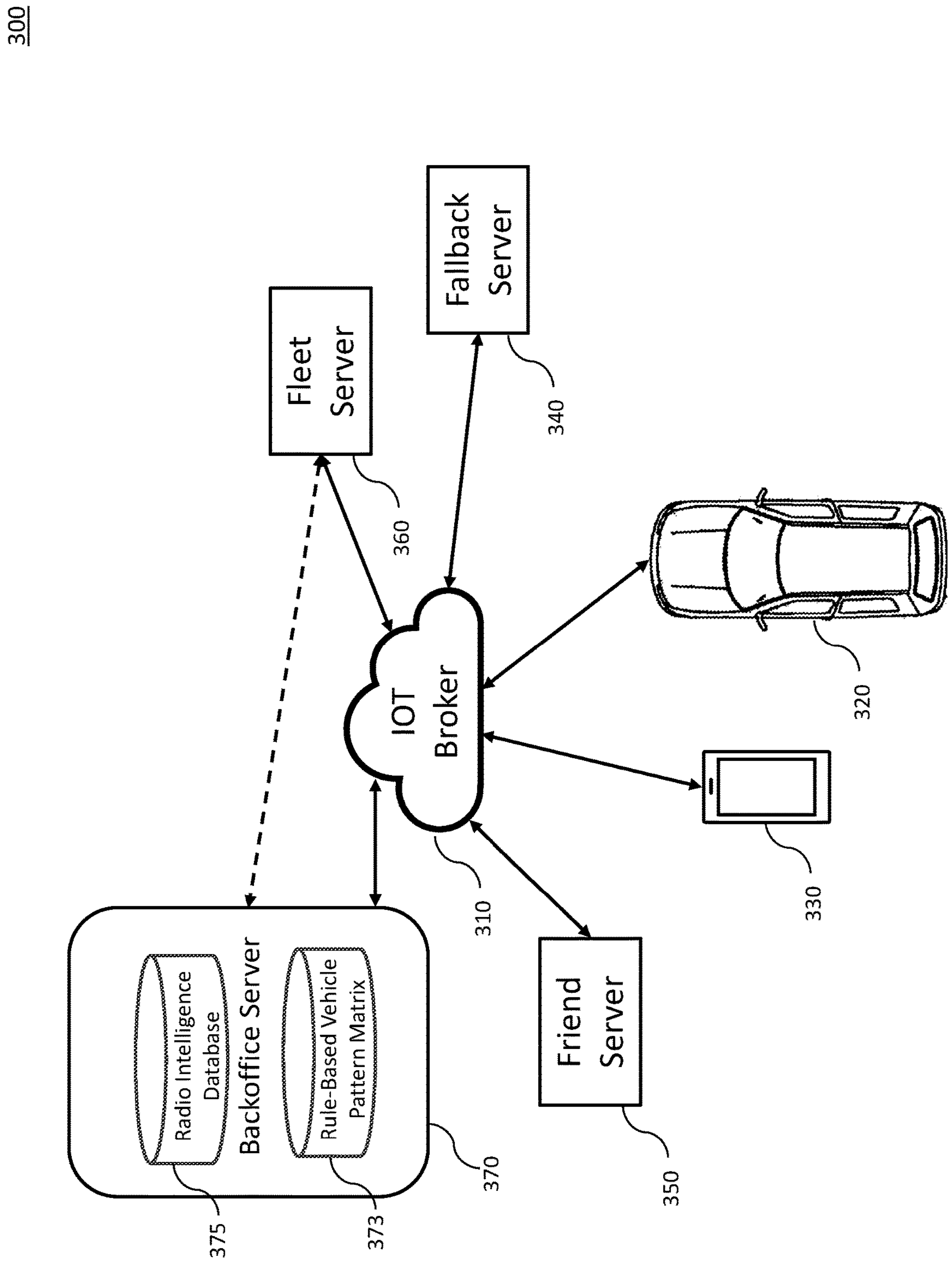
FIG. 3 is an illustration of an architecture using an internet-of-things broker to control switching of a digital key wallet, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle. Access to these vehicles has also evolved, from the use of a physical key to buttons in which to enter a code, to wireless key fobs, and to smartphone access using a digital key.

Digital keys, stored in a digital wallet, may be stored in an electronic device. That electronic device may include a mobile communication device or some type of vehicle system, for example, an electronic control unit such as a telematics system, infotainment system and the like that is eligible to hold a digital key wallet and that is bound to the vehicle's processor or server. A mobile communication device may include any portable and/or electronic device, including devices such as a smartphone, watch, glasses, tablet, mixed reality headset, or the like.

However, while a mobile communication device may hold a digital key wallet, it may also be limited in its capacity. For example, a smartphone may typically be limited to holding less than ten different digital keys. Thus, someone such as a fleet manager with a need to store large amounts of digital keys may opt for storing the digital keys in a digital key wallet that is bound to a server or an internet-of-things ("IOT") broker.

An IOT broker may be responsible for receiving messages from publisher clients, e.g., a mobile communication device or a vehicle telematics unit, and then filtering those messages to decide which subscriber is interested in a message and then sending the messages to the subscribed clients, for example a fleet manager server. The IOT broker may use a standard protocol for messaging, for example a message queuing telemetry transport ("MQTT"). Thus, an IOT broker may direct the transfer of a digital key wallet from one location to another, for example, from a mobile communication device to the IOT broker, from the IOT broker to a mobile communication device, from a vehicle telematics system to the IOT broker and then to a fleet management server.

A digital key wallet may be moved from one location to another in certain scenarios. For example, in an embodiment, a digital key wallet may be located in a vehicle's secure telematics unit, but the vehicle is about to lose its cellular connectivity. Prior to losing connectivity a software algorithm may detect that the connectivity is about to drop below a predefined threshold and initiate a transfer of the digital key wallet from the vehicle telematics unit to the cloud, for example, to the IOT broker. The IOT broker may then determine that the digital key wallet be transferred to a fallback device such as a mobile communication device.

In another embodiment, a digital key wallet may be moved from one location to another based on historical data. For example, a user travelling in a vehicle goes from a home location to the nearby coffee shop and then on to an office location. However, every time the vehicle is within 500 feet of the coffee shop the cellular signal suddenly drops. In such a scenario, a rule-based vehicle pattern matrix, which may also be referred to as a user behavior rule-set vehicle pattern matrix, may have been built over time identifying the pattern of going to the coffee shop every weekday. Further, a radio intelligence database may keep track of areas of connectivity drops. Therefore, just prior to entering the signal drop area a software algorithm at the IOT broker, based on the rule-based vehicle pattern matrix, e.g., the trip to the coffee shop, and the radio intelligence database, e.g., areas of poor cellular signals, may initiate a transfer of the digital key wallet from the vehicle's secure telematics unit to a fallback device. The fallback device may be a server, the IOT broker, a mobile communication device, or other electronic device.

Accordingly, this disclosure is directed to the use of an IOT broker, one or more servers, and one or more fallback devices, that in conjunction with a radio intelligence database and a rule-based vehicle pattern matrix may initiate a switch or transfer of a digital key wallet from one location to another. Such transfers may be initiated by client-server software algorithms that may monitor a vehicle's telematics unit in determining whether a transfer should be initiated or from a backoffice server, that based on radio intelligence and a rule-based vehicle pattern matrix that may initiate the transfer.

For example, FIG. 1 is an illustration of an architecture 100 to automatically switch digital key wallet based on pattern and radio intelligence, according to an embodiment of the present disclosure. Architecture 100 may include an IOT broker 110, a database server 115, a vehicle 120 with a mobile digital key wallet 125, a home location 130 with a smart home digital key wallet 135, an intermediate stop 140, and a fallback server 145.

People may be creatures of habit. We may visit the same shops, the same restaurants, the same places of entertainment. In addition, there may also be patterns, for example every weekday one may stop at their favorite coffee shop on the way to work. These actions may represent a travel pattern, or a set of travel patterns. Such travel patterns may be collected in a rule-based vehicle pattern matrix database, for example in database server 115. Further, in a similar manner connectivity may also be mapped by a vehicle as it travels. Consequently, a radio intelligence database may be constructed that contains information about connectivity, for example, strength of cellular signals, the presence of wireless networks, and other forms of short-range communication links.

Architecture 100 illustrates that vehicle 120 may start the day in the home location 130. Home location 130 may also include its own cloud storage that may include a smart home digital key wallet. Thus, when vehicle 120 is at home in home location 130 a user may decide to store the vehicle's digital key in the smart home digital key wallet 135 for added security. Or the user may choose to store the mobile digital key wallet 125 in the secure telematics unit within the vehicle.

From the home location 130, vehicle 120 may take a routine trip to the favorite intermediate stop 140 that the user has a habit of frequenting every weekday morning. As the database server 115 may contain a radio intelligence database and a rule-based vehicle pattern matrix database, that information may allow for a prediction of a possible connectivity issue. For example, the rule-based vehicle pattern matrix can predict that the vehicle 120 is heading to the intermediate stop 140 and that on every Wednesday for the past month there is a cellular drop right before the intermediate stop 140. Therefore, if this is a Wednesday and the vehicle 120 appears to again be heading to intermediate stop 140, the system may automatically transfer the mobile digital key wallet 125 to the fallback server 145 from its current location prior to the anticipated cellular drop area. Such a transfer may be controlled by the IOT broker 110 as it has access to the database server 115 as well as to both the mobile digital key wallet 125 and the fallback server 145.

Figure 2:
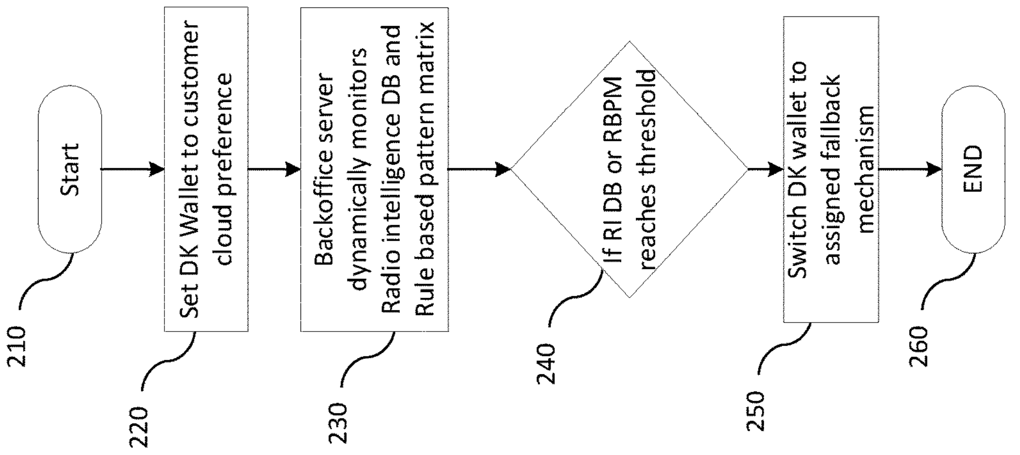
FIG. 2 is an overview flowchart of digital key wallet switching, in accordance with the disclosure.

FIG. 2 is an overview flowchart 200 of automatically switching digital key wallet locations, according to an embodiment of the present disclosure. Flowchart 200 starts at step 210 and proceeds to step 220 where the user, or customer, may set a location preference of a digital key wallet. The location may include a cloud location. The cloud may be that of an IOT broker, such as IOT broker 110, or a home location cloud such as the smart home digital key wallet 135. The preference may also include a vehicle's secure telematics that may contain the mobile digital key wallet 125. In an embodiment, the user may set the preference for the initial location. The user may be an individual, for example that selects a home location 130, or the user may be a fleet manager that selects a fleet management server as the preferred initial location.

At step 230 a backoffice server, for example, the database server 115, dynamically monitors a radio intelligence database and a rule-based vehicle pattern matrix. A radio intelligence database may predict a probability of a signal at a given instance at the location of the vehicle in question. A radio intelligence algorithm keeps track of possible communication links with a vehicle telematics unit and may output a probability of a connection. Further, the prediction may also be based on one or more categories of radio connectivity. For example, a home area may be defined as a certain distance around a home location of a vehicle. The home area is probably well defined in the sense of communication connectivity, for example the signal strength of a cellular link or the presence of a home-based cloud or other wireless network access. A second category may include a smart roaming area. A smart roaming area may include areas that may occasionally be traveled and therefore some knowledge of connectivity may be known. A third category may include a roaming area where such roaming may be in unfamiliar territory and thus connectivity may be unknown.

In addition to the backoffice server monitoring databases, in an embodiment, a vehicle telematics system may also dynamically monitor status and signal levels at the vehicle. For example, the vehicle telematics system, or another electronic control unit, may monitor a communications power level and warn the IOT broker of a power level or connection access failure as a publish topic. Such a warning may occur when the power level goes below a predefined threshold or if the connection to the client or IOT broken is broken. The topic may be subscribed to by the backoffice server that may have some level of control over the vehicle in question.

Step 240 performs the comparison of whether the radio intelligence database or the rules-based vehicle pattern matrix predicts that a communication signal is declining below a predefined threshold such that connectivity may be lost. At step 250, if the predefined threshold is crossed then a command may be initiated to switch or transfer the location of the digital key wallet to an assigned fallback mechanism and location. For example, as discussed in FIG. 1, fallback server 145 or even IOT broker 110 may be used as a fallback location to switch the digital key wallet. The flowchart 200 then may end at step 260.

FIG. 3 is an illustration of architecture 300 based on an IOT broker, according to an embodiment of the present disclosure. Architecture 300 may include IOT broker 310, a vehicle 320, a mobile communication device 330, a fallback server 340, a friend server 350, a fleet server 360, and a backoffice server 370. Further, backoffice server 370 may include a rule-based vehicle pattern matrix 373 and a radio intelligence database 375.

IOT broker 310 may be considered the controlling element in architecture 300. IOT broker 310 may act as an intermediary entity that enables MQTT clients to communicate. IOT broker 310 may receive messages published by clients, for example a vehicle's secure telematics unit, a mobile communication device, or even a server. The IOT broker 310 may then filter the messages by a topic and then distribute the filtered messages to subscribers. Thus, the IOT broker 310 may control where a digital key wallet is located.

IOT broker 310 may be treated as a primary location for a digital key wallet as it is a central device with access to servers, e.g., fleet server 360, fallback server 340, and friend server 350. In addition, vehicle 320 with its secure telematics unit may also be treated as a primary location for the digital key wallet as it is the vehicle associated with and controlled by the digital key wallet. As discussed in FIG. 2, a user may decide whether the digital key wallet is initially located in the IOT broker 310 or the vehicle 320.

Mobile communication device 330 may be treated as a fallback option. For example, if vehicle 320 has determined that its cellular signal is fading, for example the cellular signal strength falls below a predetermined threshold, then the vehicle telematics unit may message IOT broker 310 of the degrading communications links in which IOT broker 310 may then transfer the digital key wallet from the telematics unit in vehicle 320 to the mobile communication device 330. Such a transfer may be referred to as a conditional fallback.

In a similar manner, rather than transferring the digital key wallet to mobile communication device 330, the digital key wallet may be transferred to the fallback server 340, perhaps being under the control of the vehicle's manufacturer or dealer. As another example, if the vehicle 320 is part of a fleet, then a fleet server 360 may be the most appropriate place to locate the digital key wallet. Or, in another example, if vehicle 320 is intended to be shared with friends or family members, then the digital key wallet may be located on a friend server 350 that is accessible by the friends and family members.

While IOT broker 310 may have access to the backoffice server 370 and its radio intelligence database 375 and rule-based vehicle pattern matrix 373, fleet server 360 may also have access to those databases that pertain to its fleet vehicles. Thus, as discussed in FIG. 1, fleet server 360 may access radio intelligence data in order to predict the probability of a signal at a given instance at the location of one of its fleet vehicles. The fleet server 360 may also have access to the rule-based vehicle pattern matrix to predict and therefore able to predict routes and destinations and the need to transfer the digital key wallet if desired.

Figure 4:
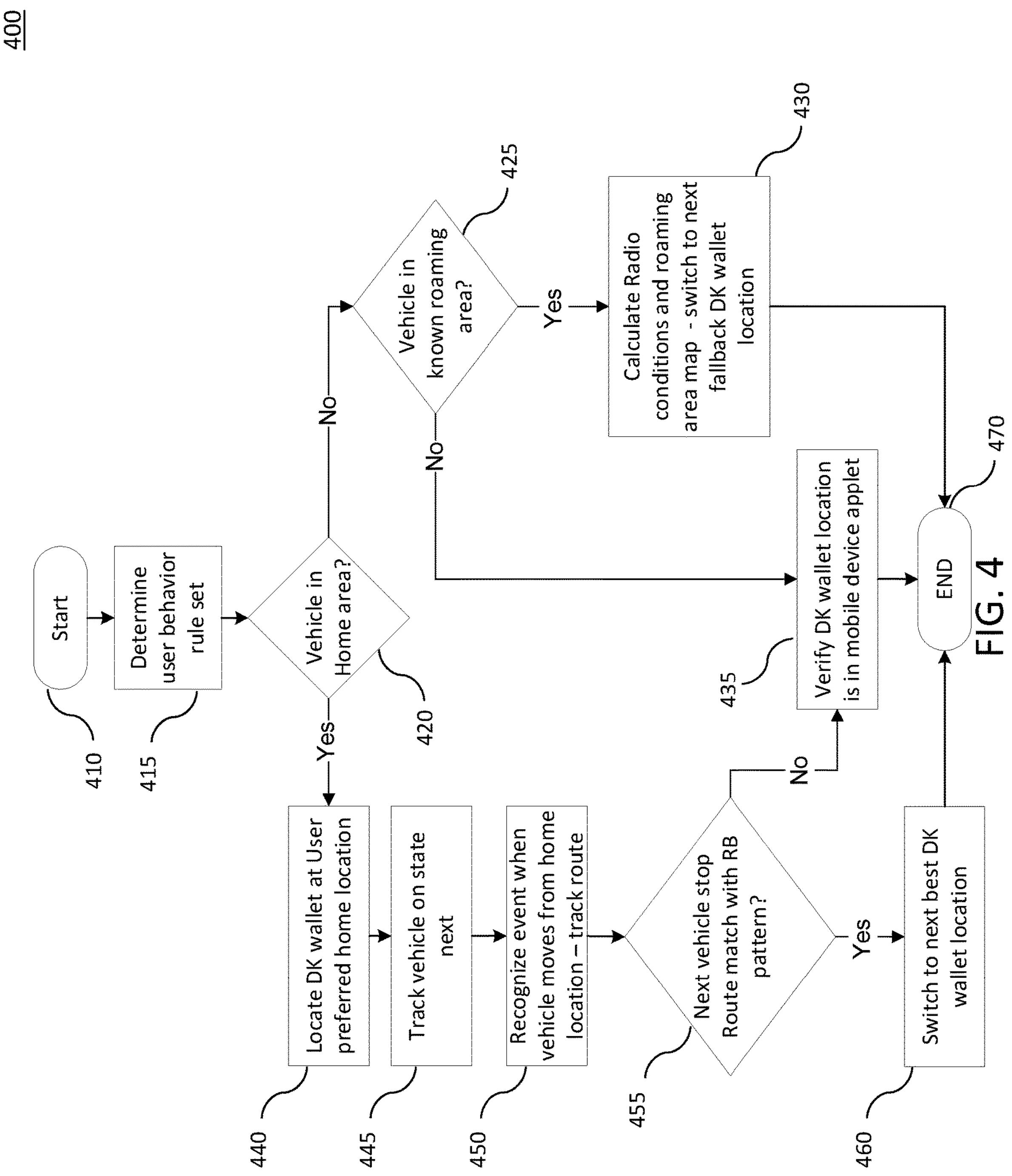
FIG. 4 is a detailed flowchart for digital key wallet switching, in accordance with the disclosure.

FIG. 4 is a detail flowchart 400 of digital key wallet switching, according to an embodiment of the present disclosure. Flowchart 400 starts at step 410 and proceeds to step 415 in which a determination may be made as to which rule-based vehicle pattern matrix is applicable that may be based on the time of day, the vehicle location, the route being taken, the trajectory of the vehicle, the number of stops made and other possible attributes. At step 420, based on the determination in step 415, it may be ascertained if the vehicle is currently located in its home area. A home area may be defined as a known area surrounding where the vehicle typically lives, for example at home location 130.

If the vehicle is not located within the home area, then at step 425 a determination may be made as to whether the vehicle is in a known roaming area, which may also be referred to as a smart roaming area. A known or smart roaming area is outside of the home area but may be travelled occasionally and thus its communication connectivity patterns may be reasonable accurate, but not fully known. For example, the intermediate stop 140 as discussed in FIG. 1 may represent a smart roaming area. If the vehicle is in a known or smart roaming area, then at step 430 a dynamic calculation of the current radio conditions may be made to update a known roading area map. Thus, as the connection pattern is reasonably known the digital key wallet may be switched to a next fallback location, for example when the vehicle is approaching a workplace location where it may be appropriate to switch to a fallback device, for example, the fallback server 145. In this scenario the flowchart would then end at step 470.

However, if at step 425 the vehicle is not in a known or smart roaming area then by default it would be in a roaming area where the connectivity patterns may be unfamiliar. As the connectivity patterns are unknown there is a chance that connectivity may be lost and therefore the digital key wallet needs to be in a mobile communication device associated with the vehicle. Thus, at step 435, the location of the digital key wallet needs to be verified. If the digital key wallet is not in the mobile communication device, then it needs to be switched to the mobile communication device applet. If the digital key wallet is already in the mobile communication device, then no further actions may be necessary. In this scenario the flowchart may end at step 470.

If, at step 420, it may be determined that the vehicle is in the home area, then at step 440 the digital key wallet may be switched to a user's preferred home location, for example in the smart home digital key wallet 135 in a smart home cloud as discussed in FIG. 1. Or the user may prefer switching the digital key wallet in the cloud in IOT broker 110 or IOT broker 310. Or the user may prefer that digital key wallet be located in a fallback device such as mobile communication device 330.

At step 445 the vehicle continues to be tracked. For example, does the vehicle stay in the home location. At step 450 the vehicle may continue to be tracked to determine when it leaves the home area, for example when the vehicle is more than a quarter of a mile from the home location. The route of the vehicle may continue to be tracked to determine if it coincides with a known travel pattern such as the rule-based vehicle pattern matrix 373.

At step 455, a determination may be made that the route does indeed match a known travel pattern in the rule-based vehicle pattern matrix. If there is a match, then at step 460 the digital key wallet may be switched to a next best digital key wallet location. For example, if the vehicle is a fleet vehicle, the next best digital key wallet location may be fleet server 360. If, however, there is not a match at step 455, then the vehicle may be traveling in an unknown roaming area and the connectivity patterns may be unknown and thus there is a chance that connectivity may be lost. Accordingly, the digital key wallet needs to be in a mobile communication device associated with the vehicle. Thus, at step 435, the location of the digital key wallet needs to be verified. Therefore, if the digital key wallet is not in the mobile communication device, then it needs to be switched to the mobile communication device applet. If the digital key wallet is already in the mobile communication device, then no further actions may be necessary. In this scenario the flowchart may end at step 470.

Figure 5:
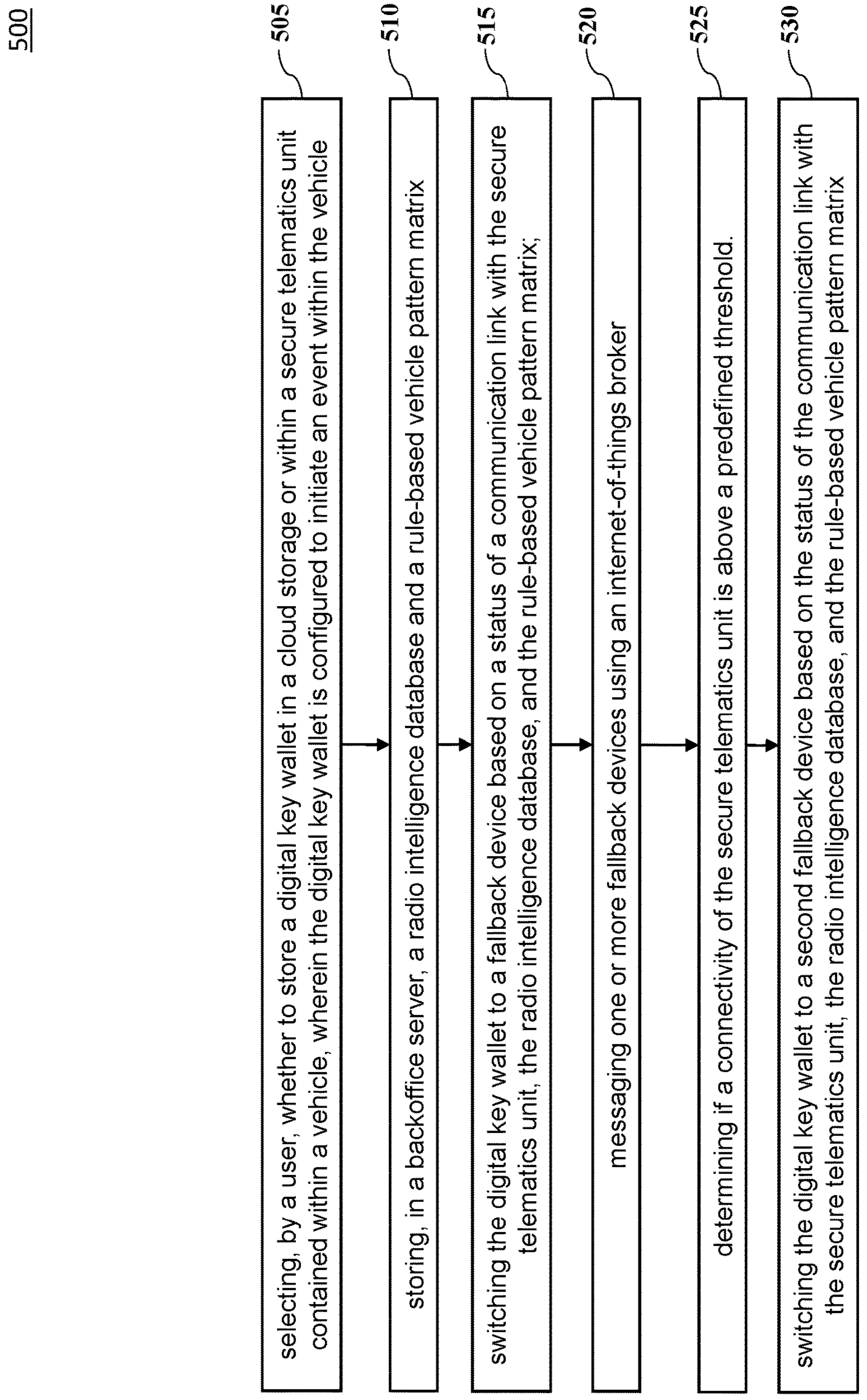
FIG. 5 depicts a flowchart of a method for determining a location of a digital key wallet, in accordance with the disclosure.

FIG. 5 illustrates a detail flowchart of a method 500 for determining a location of a vehicle digital key wallet, according to an embodiment of the present disclosure. At step 505 the method may include selecting, by a user, whether to store a digital key wallet in a cloud storage or within a secure telematics unit contained within a vehicle, wherein the digital key wallet is configured to initiate an event within the vehicle. As discussed in FIG. 2, the user, or customer, may set their preference as to where a digital key wallet is located. For example, the digital key wallet may be located in a home cloud storage. In this manner, the household members may be given authorization to access the digital key wallet. Once accessed, the digital key wallet may be used to lock/unlock the vehicle, start the vehicle, access the vehicles functions such as an infotainment system or other function. Also, as discussed in step 440 in FIG. 4, the digital key wallet may be switched to a user's preferred home location, for example in the smart home digital key wallet 135 in a smart home cloud as discussed in FIG. 1. Or the user may prefer switching the digital key wallet in the cloud in IOT broker 110 or IOT broker 310. Or the user may prefer that digital key wallet be located in a fallback device such as mobile communication device 330.

At step 510 the method may include storing, in a backoffice server, a radio intelligence database and a rule-based vehicle pattern matrix. As discussed in FIG. 1, the database server 115 may include a rule-based vehicle pattern matrix that may be built over time that may identify various routes and stops of a user where such user behavior rule sets may be based on vehicle patterns including time of day, route, trajectory, stops, and the like. Further, the database server may also include a radio intelligence database that may store data associated with cellular, wireless networks, and other short- and long-range communication links that may be used to predict the probability of a signal at a given instance at the location of the vehicle in question.

Further, as discussed in FIG. 3, the backoffice server 370 may include a rule-based vehicle pattern matrix 373 and a radio intelligence database 375. In addition, fleet server 360 may also have access to the backoffice server 370 and its databases.

At step 515 the method may include switching the digital key wallet to a fallback device based on a status of a communication link with the secure telematics unit, the radio intelligence database, and the rule-based vehicle pattern matrix. As discussed in FIG. 4, the digital key wallet may be relocated to a fallback device in certain conditions. For example, in FIG. 2, steps 240 and 250, a comparison of whether the radio intelligence database or the rules-based vehicle pattern matrix is predicting that a communication signal is declining below a predefined threshold such that connectivity may be lost and that if the predefined threshold is crossed then a command may be initiated to switch or transfer the location of the digital key wallet to an assigned fallback mechanism and location.

At step 520 the method may include messaging one or more fallback devices using an internet-of-things broker. As shown if FIG. 1 and FIG. 3, an IOT broker may be responsible for receiving messages from publisher clients, e.g., a mobile communication device or a vehicle telematics unit, and then filtering those messages to decide which subscriber is interested in a message and then sending the messages to the subscribed clients, for example a fleet manager server. The IOT broker may use a standard protocol for messaging, for example a message queuing telemetry transport ("MQTT"). Thus, an IOT broker may direct the transfer of a digital key wallet from one location to another, for example, from a mobile communication device to the IOT broker, from the IOT broker to a mobile communication device, from a vehicle telematics system to the IOT broker and then to a fleet management server.

Step 525 of the method may include determining if the connectivity of the secure telematics unit is below a predefined threshold. As discussed in steps 240 and 250 of FIG. 2, a comparison is performed of whether the radio intelligence database or the rules-based vehicle pattern matrix is predicts that a communication signal is declining below a predefined threshold such that connectivity may be lost where at step 250, if the predefined threshold is crossed then a command may be initiated to switch or transfer the location of the digital key wallet to an assigned fallback mechanism and location.

Step 530 of the method may include switching the digital key wallet to a second fallback device based on the status of the communication link with the secure telematics unit, the radio intelligence database, and the rule-based vehicle pattern matrix. As discussed in FIG. 4, at steps 430 and 460, a next best digital key wallet location may be used to move a digital key wallet in certain situations. For example, IOT broker 310 may receive multiple messages from the telematics unit in vehicle 320 about changing connectivity issues or from backoffice server 370 regarding changes in the rule-based vehicle pattern matrix or the radio intelligence database 375 that necessitate a relocation of a digital key wallet multiple times. For example, fleet server 360 may message IOT broker 310 that it wishes to retrieve a certain digital wallet key from vehicle 320 where vehicle 320 may have stored the digital wallet key in a smart home digital key wallet 135 such that the digital key wallet be transferred from the smart home digital key wallet 135 to the telematics unit of vehicle 320 to IOT broker 310 and finally to fleet server 360. There are no intended limits to where or how many times a digital key wallet may be switched or relocated.

Method 500 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A method for determining a location of a digital key wallet comprising:

selecting, by a user, whether to store the digital key wallet in a cloud storage or within a secure telematics unit contained within a vehicle, wherein the digital key wallet is configured to initiate an event within the vehicle;

storing, in a backoffice server, a radio intelligence database and a rule-based vehicle pattern matrix; and switching the digital key wallet to a fallback device based on a known location area in which communication connectivity is known, status of a communication link with the secure telematics unit, the radio intelligence database, and the rule-based vehicle pattern matrix, wherein if the vehicle stops in an unknown location area, keep the digital key wallet in the current location regardless of communication connectivity, the unknown location area being associated with an unknown communication connectivity pattern.

2. The method of claim 1, wherein the cloud storage comprises an internet-of-things broker based on a publish and subscribe messaging protocol including a message queuing telemetry transport (MQTT).

3. The method of claim 2, further comprising messaging one or more fallback devices using the internet-of-things broker.

4. The method of claim 1, wherein the fallback device is in a mobile communication device.

5. The method of claim 1, wherein the fallback device is a fleet management server.

6. The method of claim 1, wherein the fallback device is the secure telematics unit contained within the vehicle.

7. The method of claim 1, further comprising determining if a connectivity of the secure telematics unit is below a predefined threshold.

8. The method of claim 1, wherein the radio intelligence database is configured to predict a probability of the status of the communication link at a given instance at a location of the vehicle.

9. The method of claim 1, further comprising switching the digital key wallet to a second fallback device based on the status of the communication link with the secure telematics unit, the radio intelligence database, and the rule-based vehicle pattern matrix.

10. A system for determining a location of a digital key wallet comprising:

a cloud storage configured to store the digital key wallet associated with a vehicle, wherein the digital key wallet is configured to initiate an event within the vehicle;

a secure telematics unit, within the vehicle, configured to store the digital key wallet;

a fallback device, configured to store the digital key wallet; and a backoffice server configured to store a radio intelligence database and a rule-based vehicle pattern matrix;

wherein a user selects whether an initial location of the digital key wallet is stored in either the cloud storage or the secure telematics unit, wherein, based on a status of a communication link with the secure telematics unit, the radio intelligence database, and the rule-based vehicle pattern matrix, the digital key wallet is switched to the fallback device, and wherein if the vehicle stops in an unknown location area, keep the digital key wallet in the current location regardless of communication connectivity, the unknown location area being associated with an unknown communication connectivity pattern.

11. The system of claim 10, wherein the cloud storage comprises an internet-of-things broker based on a publish and subscribe messaging protocol including a message queuing telemetry transport (MQTT).

12. The system of claim 11, wherein the internet-of-things broker is further configured to control one or more fallback devices.

13. The system of claim 10, wherein the fallback device is in a mobile communication device.

14. The system of claim 10, wherein the fallback device is a fleet management server.

15. The system of claim 10, wherein the fallback device is the secure telematics unit contained within the vehicle.

16. The system of claim 10, wherein the status of the communication link further comprises determining if a connectivity of the secure telematics unit is below a predefined threshold.

17. The system of claim 10, wherein the radio intelligence database is configured to predict a probability of the status of the communication link at a given instance at a location of the vehicle.

18. The system of claim 10, wherein the rule-based vehicle pattern matrix comprises a user behavior rule-set based on a vehicle pattern including a time of day, a route, a trajectory, and one or more stops.

19. The system of claim 10, wherein based on the status of the communication link with the secure telematics unit, the radio intelligence database, and the rule-based vehicle pattern matrix, the digital key wallet is switched to a second fallback device.

20. A method for determining a location of a digital key wallet comprising:

determining a user behavior rule set based on a set of vehicle travel patterns of a vehicle;

determining if the vehicle is not in a first area then further comprising:

determining if the vehicle is traveling in a known roaming area, wherein the known roaming area is outside of the first area and where communication connectivity is not fully known, wherein if the vehicle is traveling in the known roaming area then calculate a set of radio conditions and roaming area map, and based on the calculations, switch the digital key wallet to a next fallback location, wherein if the vehicle is not traveling in the known roaming area then keep the digital key wallet in a current location;

determining if the vehicle is located in the first area then further comprising:

locating the digital key wallet to a user preferred home location;

recognizing and tracking when the vehicle moves from the first area;

wherein if the vehicle stops in a known location area, perform a switching of the digital key wallet from the preferred home location to a next best digital key wallet location, the known location area being associated with a known communication connectivity pattern, and wherein if the vehicle stops in an unknown location area, keep the digital key wallet in the current location regardless of communication connectivity, the unknown location area being associated with an unknown communication connectivity pattern.

* * * * *